United States Patent [19]
Kedrinsky et al.

[11] 3,769,877
[45] Nov. 6, 1973

[54] CRADLE OF A GEAR-CUTTING MACHINE

[76] Inventors: Vasily Nikolaevich Kedrinsky, Profsojuznaya ulitsa, 40, kv. 85, Moscow; Boris Grigorievich Zudov, Zhiluchastok Zavoda Zuboreznykh, Stankov, 31, kv. 24, Saratov, both of U.S.S.R.

[22] Filed: July 12, 1971

[21] Appl. No.: 161,898

Related U.S. Application Data

[63] Continuation of Ser. No. 836,852, July 12, 1971, abandoned.

[52] U.S. Cl. .............................................. 90/6, 90/3
[51] Int. Cl. .................................................. B23f 5/12
[58] Field of Search ......................... 90/5, 6, 8, 3

[56] References Cited
UNITED STATES PATENTS

| | | | |
|---|---|---|---|
| 1,925,726 | 9/1933 | Carlsen | 90/6 |
| 2,953,068 | 9/1962 | Carlsen | 90/6 |
| 2,895,384 | 7/1959 | Baxter, Jr. et al. | 90/6 |
| 1,335,864 | 4/1920 | Stevenson | 90/8 |

*Primary Examiner*—Gil Weidenfeld
*Attorney*—Waters, Roditi, Schwartz & Nissen

[57] ABSTRACT

A cradle for a bevelled gear generating machine comprising two slidably mounted tool holding arms pivotably connected to respective levers, each in turn being supported on an axle spaced from the pivot axis of the arms to the levers. Each arm can be pivotably moved about its respective pivotal connection with the lever and each lever can be pivotably moved about its axle, the latter movement being in a direction substantially perpendicular to the pivotal movement of the arm relative to the levers, so that the combined movements of the levers and its respective arm can move the tool carried by the arm along a predetermined closed path. Each tool holding arm is slidably mounted inside a turnable segment within the cradle for setting the tool carried by the arm at a desirable tooth angle of the gear to be machined.

6 Claims, 4 Drawing Figures

CRADLE OF A GEAR-CUTTING MACHINE

The present invention relates to gear-cutting machines and, more particularly, to cradles for gear-cutting machines designed for machining teeth of straight bevel gears by cutting.

The present invention may be also used for cutting teeth of straight bevel and spur gears, or other similar workpieces, such as toothed couplings, with matching toothed surfaces.

Known in the prior art is a cradle of a gear-cutting machine which comprises a drum having segments mounted therein and carrying slides used for fixing the tool or cutters. The slides are imparted a rocking motion by a crank gear and the cradle is provided with a device used to adjust the slides to the length of the generatrix of the pitch cone of a gear being machined.

Employment of cutting tools operating in one and the same tooth cavity of a gear being cut for cutting straight bevel gears by a generating technique provides better conditions for cutting by the tool and completely identical conditions for machining all the cavities of a gear being cut, which contributes to precise manufacture of the latter. However, the aforesaid cradle possesses various disadvantages.

The vertical slides are secured to the front end of the segments through an intermediate plate and are disposed far outside the generating cradle housing and, therefore, extend far from the cradle support, which decreases the rigidity of the unit and the precision of the machining of teeth.

The drive of the cutter, mounted on the slide, has a spindle whose axis is inclined to the plane of rotation of the cradle, due to which the tool heads are also inclined, and, to prevent the latter from interfering with the work head, the workpiece must be placed on a long arbor, which considerably decreases the rigidity of the workpiece fastening and the precision of cutting of a gear.

In the course of its operation, the cutter describes curves that are characterized by great convexity, due to which the bottom of the tooth space thus formed is too concave, which is not desirable for many designs of toothed gears.

The curve, described by the cutters, is designed for a tooth having maximum depth, and cannot be altered during the machine set-up. Therefore, the large radius of the curve at the points of transition from the forward stroke to the reverse stroke remains constant, and during a great part of their running the cutters perform no cutting, which decreases the machine efficiency.

As a result of this, it is vertually impossible to cut gears, in which the hubs protrude forward i.e. beyond the cone center, for in this case the distance which the cutters extend beyond the faces of the workpiece is strictly limited.

Each time the cradle performs its reverse stroke, the table carrying the workpiece is retracted together with the workpiece from the tools, which entails displacement of massive parts which do not come back to their initial positions with absolute accuracy, and, therefore, brings about errors in the pitch of the gears being cut.

The present invention contemplates the development of a design of the cradle of a gear-cutting machine, used for machining teeth of straight bevel gears by tools operating in one and the same tooth-space, that is free of the afore-mentioned disadvantages and will allow an increase in the precision of machining of gears.

The afore-said task is accomplished by the provision of a cradle of a gear-cutting machine, used for machining teeth of straight bevel gears by means of tools operating the same tooth space, which cradle comprises a generating drum having turnable segments mounted therein carrying tool holding arms or slides. The slides are subjected to a rocking motion, and a means is employed for adjusting the position of the slides to the cone distance of the gear being machined. In accordance with the present invention, each of the slides is pivotally connected to a lever which in turn can be pivoted with respect to the cradle segment, for imparting a longitudinal motion to the slide.

It is expedient that the guides in the segment for the slides be inclined with respect to the axis of symmetry of the cradle at an angle close to the pressure angle of the gear being cut.

To adjust the arms carrying the tools to the cone distance of the gear being machined, the levers are supported by carriages mounted in guides in the interior of the cradle.

To extract the tool from the tooth space of a gear being machined during the idle period before the return stroke it is expedient to use a gripper for operating on the levers. The gripper is connected to the rod of a hydraulic cylinder disposed in the cradle drum.

It is also necessary to extract the tool from the toothspace of a gear being machined at the end of the forward stroke and to introduce it into the space upon completion of the reverse stroke, and this is effected by a cam interacting with the lever.

The following detailed description of a specific exemplary embodiment of the present invention is given with reference to the accompanying drawings, in which.

Figure 1:
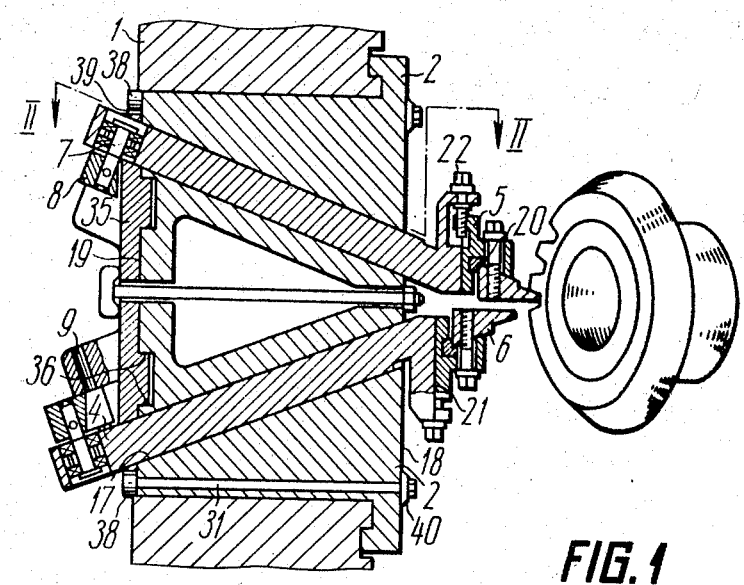
FIG. 1 is a longitudinal sectional view of the cradle of a gear-cutting machine for machining teeth of straight bevel gears, according to the invention.
Figure 2:
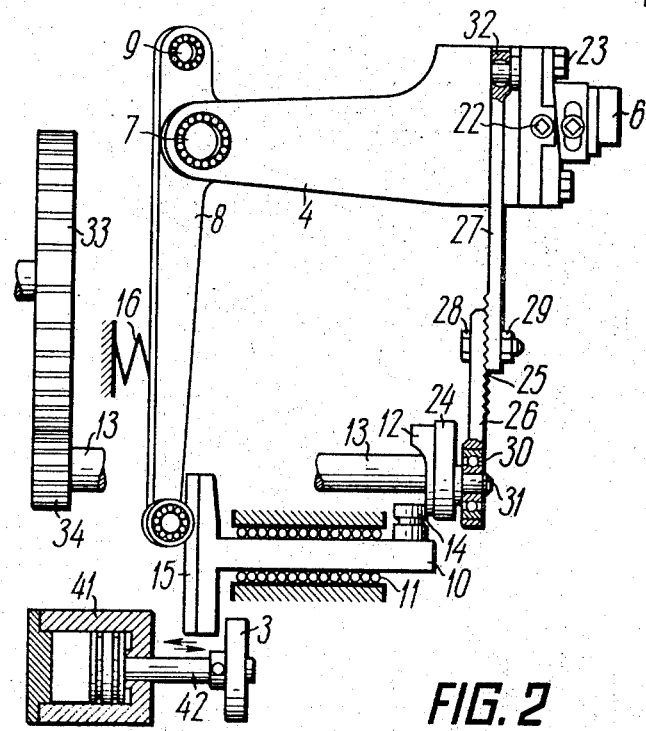
FIG. 2 is a section taken on the line II—II of FIG. 1 showing the levers and a drive for displacing them, according to the invention.
Figure 3:
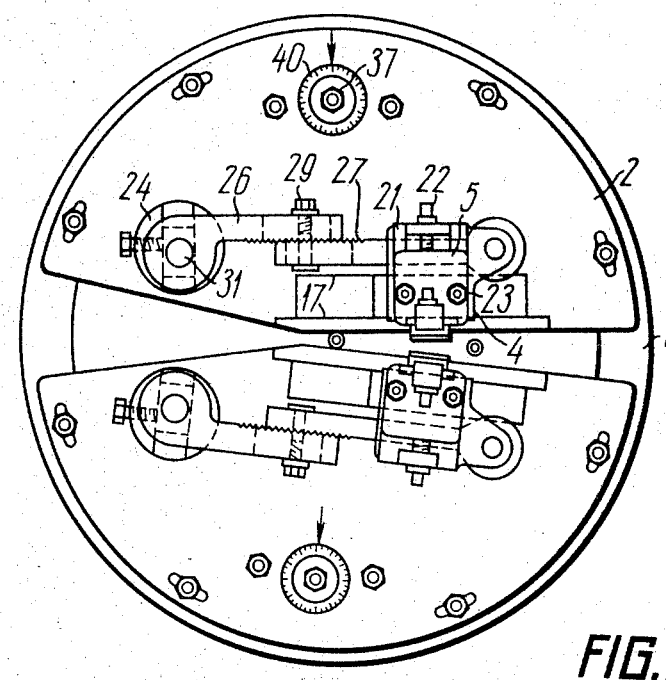
FIG. 3 is a front elevational view of the cradle.
Figure 4:
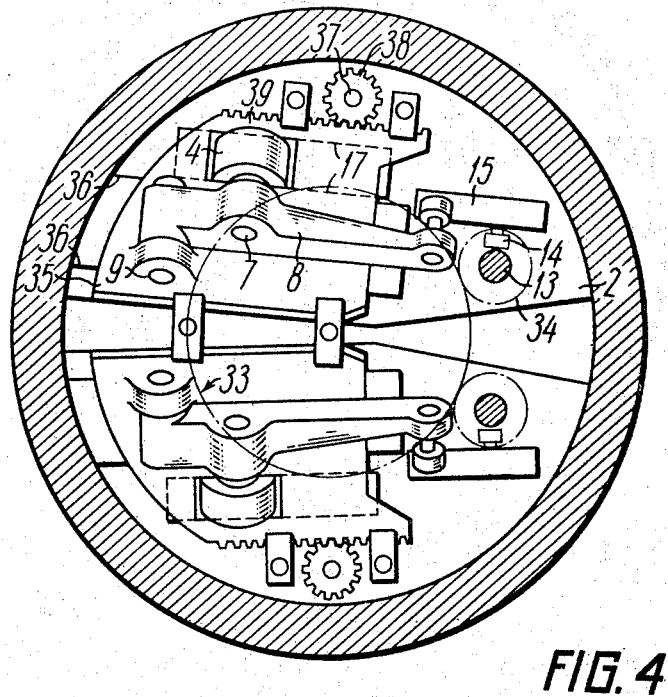
FIG. 4 is a rear elevational view of the cradle.

A cradle of a gear-cutting machine used for machining teeth of straight bevel gears comprises a generating drum 1 (FIG. 1) having two turnable segments 2 mounted therein, each of the segments 2 carrying a slide or tool holding arm 4 driven by a crank gear assembly mounted on a respective segment. The crank gear assembly comprises a drive shaft 13, crank-plate 24 with a crankpin 31 mounted thereon and a connecting rod 25 of adjustable length whose free end is pivotably connected to the tool holding arm 4. The cradle also comprises a gripper 3 (FIG. 2) used for extracting both tools from the tooth space of a gear being machined at the time of cradle return rotation and means for adjusting the slides 4 to the cone distance of a gear being machined (to be fully described later).

Each arm 4 carries a tool holder 5 (FIG. 1) with a cutter 6 and is mounted on an axle 7 secured on a lever 8 for pivotably moving along a radius whose center is at axle 7.

The lever 8 can be rocked relative to axle 9, disposed in the cradle segment 2, and thus the lever 8 imparts a longitudinal displacement to the arm 4.

The lever 8 is rocked by a pushed 10, mounted for reciprocation in guides 11 of the segment 2 and driven by a butt cam 12, positioned on shaft 13 of the crank gear.

One end of the pusher 10 carries a roller 14, which con-tacts the face of the cam 12, whereas the other (flat) end 15 of the pusher 10 contacts the free end of the lever 8. The afore-described system is tensioned by means of a spring 16. When the cutting gears have great size, the system may be tensioned, for instance, by a hydraulic means.

By presetting the required shape of the cam 12, it is possible to obtain a trajectory of cutter movement with minimum transitions between the forward and reverse strokes, which makes it possible to cut gears with hubs ex-tending forward.

The arm 4 carrying the tool is disposed in guides 17 (FIG. 1) in the segment 2, which guides are inclined at an angle close to the pressure angle of the gear being machined.

The guides 17 are disposed inside the segment 2 of the cradle generating drum 1, and it is only the tool holder 5 with the cutter 6 that protrude beyond the end 18 of the segment 2 facing the cutting zone. The lever 8 and its axle 9 are disposed at end 19 of the segment 2 facing the interior of the cradle (i.e., opposite to the cutting zone).

Due to the afore-described disposition of the arm 4, the distance to which the cutter protrudes with respect to the end 18, is as small as possible, and, with the lever 8 disposed on the end 19, the cutting zone is clear and allows the cutting of gears mounted on short rigid arbors.

The above makes it possible to increase the rigidity of the cradle construction in the course of the cutting process and, therefore, raises the precision of cutting of gears.

The tool holder 5 disposed on the arm 4 is of a standard design and allows control of the angle of inclination of the cutting edges of the cutter by means of a wedge 20 of conventional construction of the type as shown in U.S. Pat. No. 2,101,237, and, in this way, to vary the effective pressure angle of the gear being machined, and to obtain a required disposition of the tooth bearing pattern with regard to the tooth height.

To mount the cutters and to obtain the required disposition of the tooth bearing pattern with regard to the tooth length in the course of meshing of gears being manufactured, the tool holder 5 is made so that it can be displaced vertically along guiding faces 21 of the arm 4 by a screw 22 (FIG. 2) and be fixed in a required position by screws 23.

The crank gear assembly essentially comprises crank plate 24 (FIG. 2) having an adjustable crank pin 31 mounted thereon, plate 24 being secured on the drive shaft 13. The pin 31 is hinged to a connecting rod 25. To adjust the length of the connecting rod 25 when adjusting the slides to the length of the distance of a gear being cut, the connecting rod 25 is made of two portions 26 and 27, which are interconnected by a screw 28 and a nut 29, portion 26 of the connecting rod 25 being connected by means of a spherical bearing 30 to crank pin 31, and the portion 27 being secured by means of a spherical joint 32 to the slide arm 4.

The shaft 13 of the crank gear is rotated through a pair of gears 33 and 34, the axis of rotation of the driving gear 33 coinciding with the axis of rotation of the cradle generating drum 1.

To adjust arms 4 to the cone distance of the gear to be cut, carriages 35 (FIG. 1) are provided on which the axles 9 of the levers 8 are secured. The carriages 35 are disposed in guides 36 in the end 19 of segments 2, and the carriages are displaced by hand by turning a roller 37 carrying a gear 38 which engages a tooth rack 39 mounted on the carriages 35. The displacement of the carriages 35 results in displacement of the lever 8 and arm 4 so that the axle 7 of the arm 4 moves to a required position according to the cone distance of the gear geing cut and this is indicated by a knob 40.

The cradle drum 1 houses a hydraulic cylinder 41 (FIG. 2) whose rod 42 is provided with the gripper 3 capable of engaging the flat end 15 of the pusher 10. The pushers 10 push against both levers 8 turning the latter around their axles 9, and impart a longitudinal displacement to the arms 4, as a result of which both cutters 6 are extracted from the tooth space of a gear being machined during the period of cradle return rotation.

Due to withdrawal of the tools instead of the gear the movement of heavy parts of the machine is decreased, which, in turn, results in an increased precision of the machining of the teeth.

In the ourse of machining the teeth of a gear by the gear-cutting machine the cradle operates as follows.

The gear 33 is driven and, through the intermediary of the gear 34 the shaft 13 of the crank 24 is driven. The crank 24 operates the connecting rod 25 which causes rocking of the arm 4 with respect to the axle 7. The cutter 6 secured on the arm 4 rocks therewith along the tooth of a gear being cut along an arc centered on axle 7. The length of this radius being relatively great, the circumference of the bottom of the space of a tooth being cut differs only insignificantly from a straight line.

From the shaft 13, on which the cam 12 is secured, movement is imparted through the roller 14 to the pusher 10, whose flat end 15 causes the lever 8 to rock on the axle 9. Since the axle 7 of the arm 4 is disposed on the lever 8 and the arm 4 and levers 8 are in a mutually perpendicular relation, the arm 4 is given a longitudinal displacement, and the cutter 6 performs an additional movement which is perpendicular to the main one and allows extraction of the cutter 6 from the tooth space of a gear being cut at the end of the forward stroke and introduction into the space upon completion of the reverse or return stroke, it being understood that the movement of arms 4 are so timed that when one tool performs its working stroke, the other tool performs its return stroke.

The combination of the main and additional movements of the arm 4 makes it possible to obtain a trajectory of movement of the cutter 6 for cutting a tooth. The time and distance, for which the cutter has to be retracted, are determined by the shape of the cam 12 only. By using various cams it is possible not only to preset any required trajectory of the cutter movement, but also, depending upon the size of a gear being machined, to adjust the length of its reverse stroke. This allows minimizing the length of the cutter overrunning, which is especially important when cutting gears in which the hubs protrude forward.

To set the arms 4 in accordance with the length of the cone distance of a gear being cut, it is necessary to turn the roller 37 by the gear 38 and to displace through the intermediary of the toothed rack 39 the carriage 35 along the guides 36, as well as to respectively change the length of the connecting rod 25.

With the cradle operating stroke completed, in order to extract the cutters from the tooth space of a gear being cut, pressurized oil is supplied to the cylinder 41, which result in displacement of the gripper 3 with the rod 42, and, hence, of the pushers 10 of both slides interacting with the gripper 3. While moving, the pushers 10 turn the levers 8 in a clock-wise direction around the axle 9, which results in a longitudinal displacement of the arms 4, corresponding to the extraction of both cutters 6 from the tooth space of the gear being cut.

The extraction of the cutters from the tooth space of a gear being cut during cradle reverse rotation makes it possible to dispense with displacement of such bulky parts as the table with the workpiece stock secured thereon, which, in its turn, allows increase of the precision of the cutting of gears.

The proposed design of the cradle with insignificant constructive alterations may be employed in machines used for machining the teeth of spur gears, especially in instances where a generating workpiece is driven by a belt drive.

Though in describing the present embodiment of the invention, specific narrow terminology has been used for the sake of clarity, the invention, however, is not limited to the terms used, as each such term embraces all equivalent elements operating analogously and used for achieving the same tasks.

Though the present invention is described in connection with the preferred embodiment thereof, it is evident that alterations and modifications can be made without departing from the spirit and scope of the invention as those skilled in the art will readily understand.

Such alterations and modifications are considered to fall within the subject-matter and scope of the invention and the appended claims.

We claim:

1. A cradle for a bevel gear generating machine, the cradle being adapted for being driven in rotation and comprising two segments mounted therein, a slidably mounted tool holding arm in each segment, a pivot on each one of said arms, two levers each pivotably connected to one of said arms at a respective of said pivots, first drive means for swinging each arm relative to its associated lever about its respective pivot, means supporting each lever for pivotable movement about a pivot axis spaced from the pivot by which the lever is connected to its associatd arm, and second drive means for rotating said levers about their pivot axes in directions substantially perpendicular to the pivotable movement of the respective arms relative to said levers so that the combined pivotal movements of each lever and its respective arm can move each tool along a predetermined closed path.

2. A cradle as claimed in claim 1 comprising guides in said segments for slidable support of the tool holding arms, said guides being arranged so that the respective arm moves in a plane which is inclined to the axis of rotation of the cradle at an angle substantially equal to the pressure angle of the generating tool.

3. A cradle as claimed in claim 1 comprising adjusting means for adjusting the position of the pivot axis of each tool holding arm to the cone distance of the gear to be machined, said adjusting means comprising, for each tool holding arm, a carriage mounted in a guide provided in a respective segment, an axle on said carriage supporting said lever for pivotable movement about said pivot axis, and means for moving each carriage.

4. A cradle as claimed in claim 1 comprising a hydraulic cylinder carrying gripper positioned to turn the levers about their pivot axes for withdrawing the tools from the workpiece.

5. A cradle as claimed in claim 4 wherein said first drive means comprises a crank drive including a connecting rod connected with a corresponding tool holding arm to swing the latter to and fro and said second means comprises a cam means coupled with said crank drive for causing the respective lever to oscillate about its pivot axis to move the respective tool along its predetermined closed path.

6. A cradle as claimed in claim 5 in which said connecting rod is of adjustable length so as to adjust the position of the tool holding arm.

* * * * *